US006472976B1

(12) United States Patent
Wohl

(10) Patent No.: US 6,472,976 B1
(45) Date of Patent: Oct. 29, 2002

(54) MONITORING LOCATION AND TRACKING SYSTEM

(76) Inventor: Charles M. Wohl, 3324 Emerson Ave. NE., Cedar Rapids, IA (US) 52411

( * ) Notice: Subject to any disclaimer, the term of this patent is extended or adjusted under 35 U.S.C. 154(b) by 0 days.

(21) Appl. No.: 09/316,405

(22) Filed: May 21, 1999

(51) Int. Cl.[7] .................................................. H04Q 5/22
(52) U.S. Cl. ............... 340/10.41; 342/457; 342/357.07; 342/357.17; 342/419
(58) Field of Search ................................. 340/5.9, 5.91, 340/825.36, 825.49, 572.1, 572.4, 10.41; 705/22, 29; 701/29, 207; 342/42, 547, 457, 357.07, 357.17, 419

(56) References Cited

U.S. PATENT DOCUMENTS

| | | | |
|---|---|---|---|
| 4,656,463 A | | 4/1987 | Anders et al. |
| 5,021,794 A | | 6/1991 | Lawrence |
| 5,243,652 A | | 9/1993 | Teare et al. |
| 5,461,390 A | | 10/1995 | Hoshen |
| 5,485,163 A | | 1/1996 | Singer |
| 5,499,032 A | | 3/1996 | Kelley et al. |
| 5,510,798 A | | 4/1996 | Bauer |
| 5,664,113 A | * | 9/1997 | Worger et al. .............. 705/28 |
| 5,748,148 A | | 5/1998 | Heiser et al. |
| 5,844,482 A | * | 12/1998 | Guthrie et al. .............. 340/568 |
| 5,870,029 A | | 2/1999 | Otto et al. |
| 5,883,598 A | | 3/1999 | Parl et al. |
| 5,884,221 A | | 3/1999 | Wortham |
| 5,895,436 A | | 4/1999 | Savoie et al. |
| 5,905,461 A | | 5/1999 | Neher |

* cited by examiner

Primary Examiner—Michael Horabik
Assistant Examiner—M. Shimizu
(74) Attorney, Agent, or Firm—Joseph C. Herring

(57) ABSTRACT

The location systems are made up of a monitoring and control center, repeaters and tags.

System communications are preferably at frequencies in the 900 MHz band. The center and computers utilize both commercial and custom software developed for use in and by the system. The center, repeaters and tags can also include a sensor(s) and a panic "switch" and/or other informational input mechanism(s). The coordinates of the repeaters and control station transmitters are stored in tag memory. The location of the tag(s) in time and space is by use of the stored coordinates in memory and by calculations based on time phase measurements of transmissions from the control center an/or the repeaters.

16 Claims, 5 Drawing Sheets

MONITORING LOCATION AND TRACKING SYSTEM

BACKGROUND OF THE INVENTION

The invention relates to systems for locating and/or identifying animals or objects within an operating environment created through use of a control center, transceivers (repeaters) strategically located to reduce signal distortion or loss, and "tags" which are affixed to the animals and objects. The systems are designed to support a subscriber base and to detect and/or record movement, a lack of movement, the direction and rate of movement of the tagged animals or objects and the projected direction and rate of tag movement. The systems can also provide subscribers with sensor inputs, e.g., pulse and temperature. Tag size, power consumption and cost have limited the utilization of such systems.

The use of tags utilizing a microcomputer and transceiver repeaters and a control unit to inventory moving and moveable items is thoroughly explained by F. W. Anders, et al, U.S. Pat. No. 4,656,463. This patent teaches a variety of types of location and identification tags and their circuitry, operating modules, frequencies and programming. The use of some types of tag encryption, chip programming and reprogramming and sensors is also explained.

B. F. Rice, U.S. Pat. No. 5,452,328, teaches a location system utilizing multicode spectrum spreading techniques.

Joseph Hoshens, U.S. Pat. No. 5,461,390, teaches a system designed to track stalkers, stalkees, abducted or stolen animals or objects to which tags are attached. Police mobile units, which can be vectored to potential trouble spots, or to respond to emergencies.

The system is based on a cell phone-type network. Polling signals are sent to transceivers (repeaters) in each cell which then broadcast the polling signals to each of the tags. Each of the polled tags then interrogates a unit of a global positioning system to obtain its coordinate position. This information is then broadcast to the control center via the repeaters. Alternately, the tags can transmit signals which are triangulated by the control center data processor to obtain the tag location. The coordinates are then, in the case of a stalker, compared with the spatial coordinates of locations, permitted to the stalker or the stalker's spatial relationship to the stalkee. If the stalker is in a nonpermitted area, or too close to the stalkee, police are then notified of the fact. In the case of an abducted child, the presence of the child in a location outside a designated area would trigger a notification of the police. Alternately, the child can trigger an abduction-in-progress alarm.

M. S. Singer, et al, U.S. Pat. No. 5,483,163, teach a child monitoring system where the tag is polled or activated by the wearer. The polled tag then transmits an identification/location signal to the network repeaters. The repeaters then transmit the signal to the control centers to enable the child, potential molesters, etc., to be located in a signal strength analysis of the inputs from the control center and/or repeaters.

Later, S. J. Heiser, et al, U.S. Pat. No. 5,748,148 is quite detailed. It teaches systems specifically designed to reduce signal distortion and to extend tag battery life. The tags respond to a polling enquiry at a response amplitude which is selected to reach only nearby relays and/or the control center to calculate the tag, including the coordinates of the broadcasting report location.

J. C. Otto, et al, U.S. Pat. No. 5,870,029, teaches the location of objects or persons, e.g., a person under house arrest, within designated areas. Effectively speaking, a police car acting as a mobile transceiver is dispatched to apprehend the fugitive when he or she is outside the designated areas. A geo-positioning system is utilized to provide the necessary spatial coordinates. The mobile transceiver utilizes signal strength, ranging Doppler effects, phase shifting, radio direction, time difference of signals arrived and radio frequencing ranging for determining the location of the tagged individual or object.

S. A. Parl, et al, U.S. Pat. No. 5,883,598, teach a location system designed to augment cellular phone or paging systems. Each tag transmits locating signals to one or more repeaters within the cell areas. A base station relay (repeater) within the cell areas receives the locating signals and transmits to the control center signals indicative of the phase and amplitude of each locating signal as received. These data provide the basis for calculating the tag(s) position(s).

SUMMARY OF THE INVENTION

The tag-based systems of this invention utilize a monitoring and control center (center), repeaters and tags. The systems differ from those of the prior art in that commercial chips, chip sets, and software are combined with custom (application) software and provide a unique center and smaller, cheaper and more versatile tags. The repeater and center location data are embedded in tag memory, e.g., permanent (ROM) and/or recordable memory, e.g. EEPROM and EAPROM. The tag function is readily augmented through the use of embedded of plug-in sensors which communicate with tags by rf or light communication.

DETAILED DESCRIPTION OF THE FIGURES

The identification numbers remain constant from Figure to Figure. Multiple element designations are via the use of an alphabetic designator.

Figure 1:
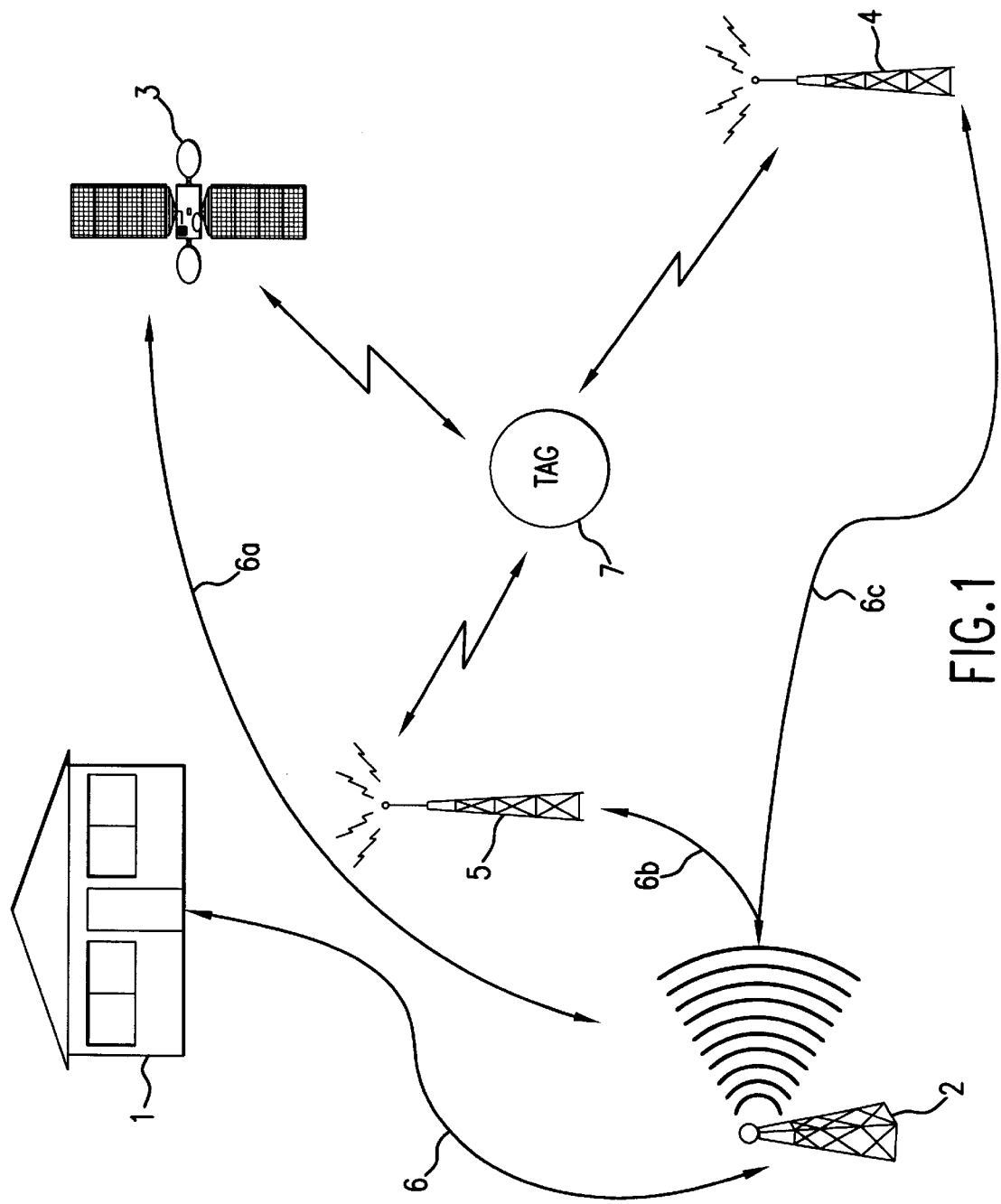
FIG. 1 is a functional diagram of the preferred type of a monitoring, location and identification system.

FIG. 1 depicts a center 1, which communicates with its transmitter 2, and repeaters 3, 4 and 5 preferably positioned on a cell phone network repeater support to create a monitored area. Communication between center 1 and transmitter 2 is via cable 6. Communication between transmitter/receiver 2 and exemplary repeaters 3, 4, and 5 can be by rf, light or microwave transmission but is preferably by cables 6a, 6b and 6c.

A tag 7 is attached to an animal or object and communication between the tag 7 and the nearest repeaters 3, 4, and 5 and transmitter/receiver is by rf transmission.

Figure 2:
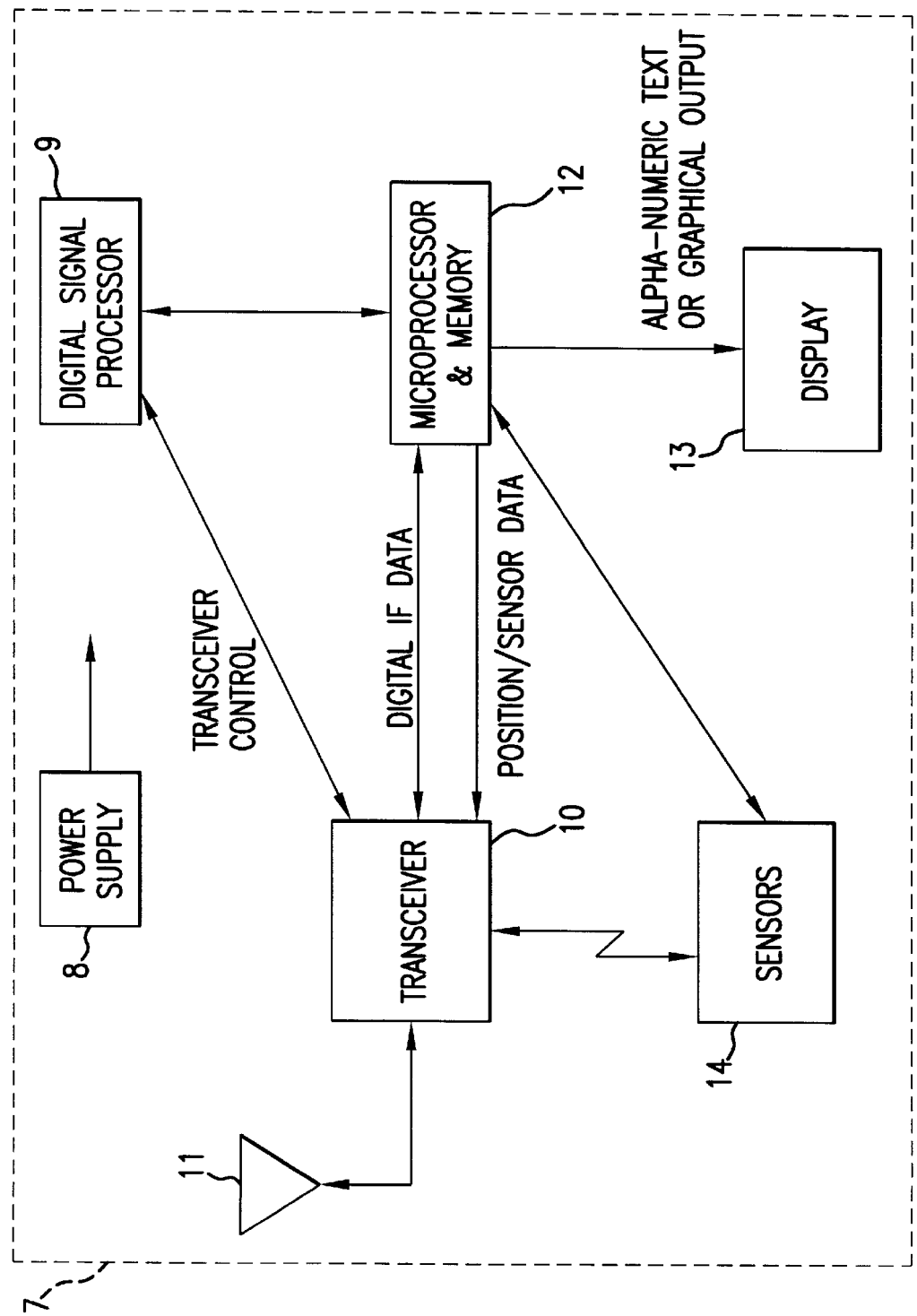
FIG. 2 is a block diagram including the hardware, software and sensors utilized in and associated with a tag for use with animals and objects which are to be monitored, located, tracked and/or inventoried.

The tag 7 of FIG. 2 includes a power supply 8. The power supply 8 provides the proper voltage electricity to the ReFLEX™ signal processor 9, the transceiver 10 and its antenna 11, the microprocessor (including memory) 12, digital display 13 and, to a sensor(s) 14 when the sensor(s) 14 are connected physically to tag 7 as shown. When a tag 7 is connected to the sensor 14 only by rf communication, the sensor 14 utilizes its own power supply.

Figure 3:
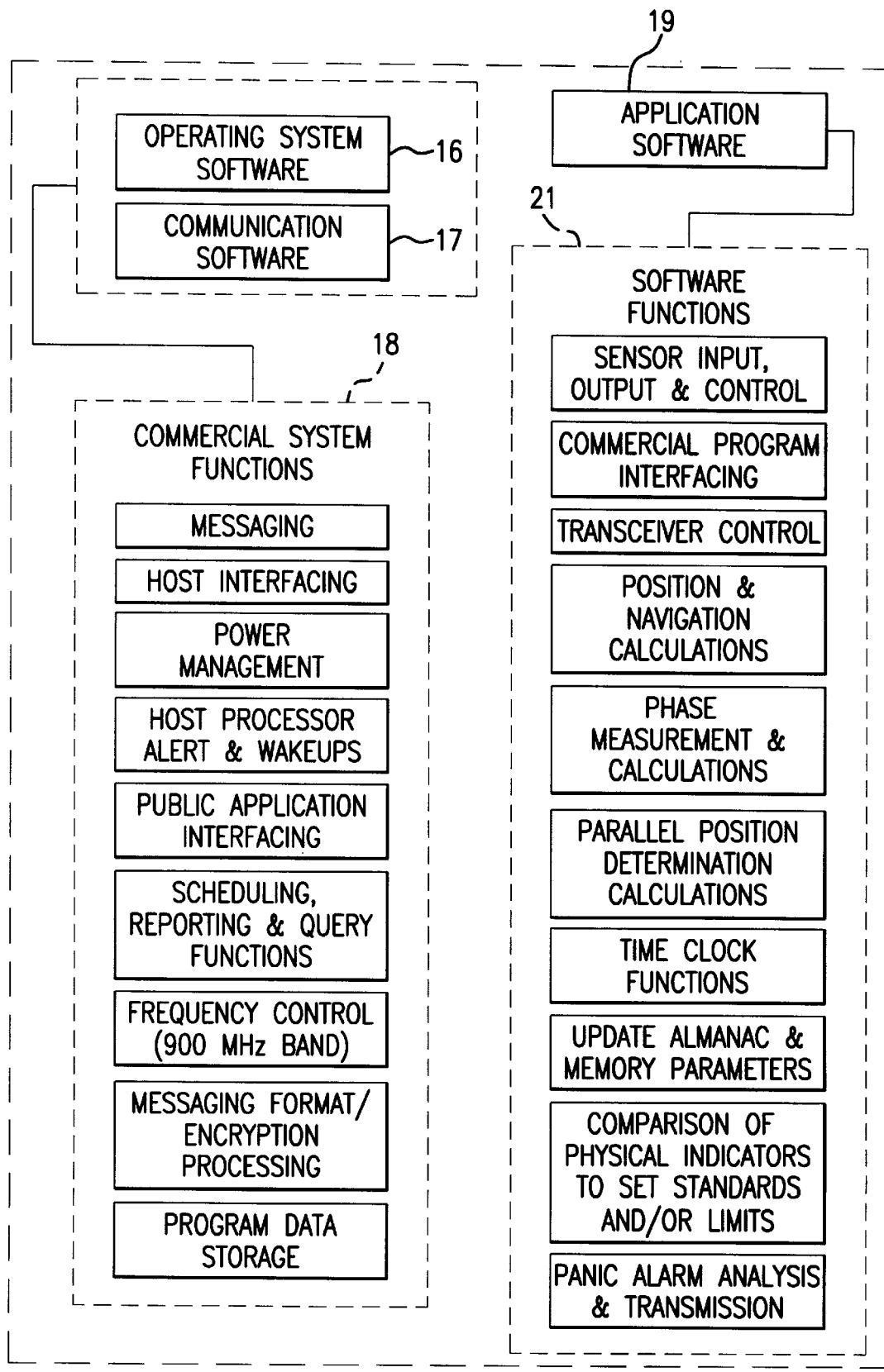
FIG. 3 blocks out the commercial software packages and the functions of the custom software on which the system of FIG. 2 operates.

The ReFLEX signal processor 9 controls transmissions by Transceiver 10 and interacts digitally with microprocessor 12 utilizing the commercial and custom software which provide at least the functions of FIG. 3.

The software packages and functions of FIG. 3 are made up of a ReFLEX stack software program 16 and a Message Manager™ program 17. The functions of these software packages are listed in the Commercial System Functions block 18. The Custom Application Software of block 19 performs the functions listed in block 21 under Custom System Functions.

The preferred commercial equipment and software are described in more detail in Motorola, Inc., Schaumburg, Ill. USA sales and technical literature and on the Internet using downloaded Adobe Acrobat reader under the various hyperlink addresses described in the Motorola literature relating to their Trademarked products described above.

The custom software functions briefly mentioned in the Figures are utilized in operating the tags generally include:

providing an operating interface between the instructions of the custom software and the instructions of the commercial software;

controlling, to the extent necessary, sensor operation, input and output;

providing instructions necessary for the operation of the transceiver of each tag and the center utilizing the commercial software;

calculation of the period of delay between the time of broadcast of each signal received by a tag and the time each signal actually is received by each tag;

measurement of the change in the phase between the original phase, as transmitted, and the phase of the broadcast signal as received by each tag, simultaneous calculation, preferably using Kalman filter techniques, of the position of each tag from the calculated transmission delay periods and phase changes of signals from the transmitter receiver and repeaters;

controlling the functioning of each of the clocks in the monitoring and location center and in each tag;

updating and maintaining, as needed, by the center and each tag, the data required to maintain the almanic containing dates, location, operating frequencies and other operating parameters of the center and each tag;

comparing the operations of the center and of each tag with operational standards established for each of the tags to determine any deviations from normal operating parameters, to establish new operating parameters where and when required, to limit or terminate operation of particular or total functions of one or more tags and/or repeaters in the system, and provide for repair modification and/or replacement of tags, tag components, and functions;

analyzing panic alarm signals from one or more tags to determine the last location(s) of the last signals received from any tag going off line, which has a low power source charge or which indicates pending operational failure; transmitting operating and/or replacement notice instructions for the tag, and/or sensor(s) and/or display and directing any other needed action to help ensure the safety, location, health or condition of the animals or objects to which the tags and/or sensors providing the alarm signals are attached.

Figure 4:
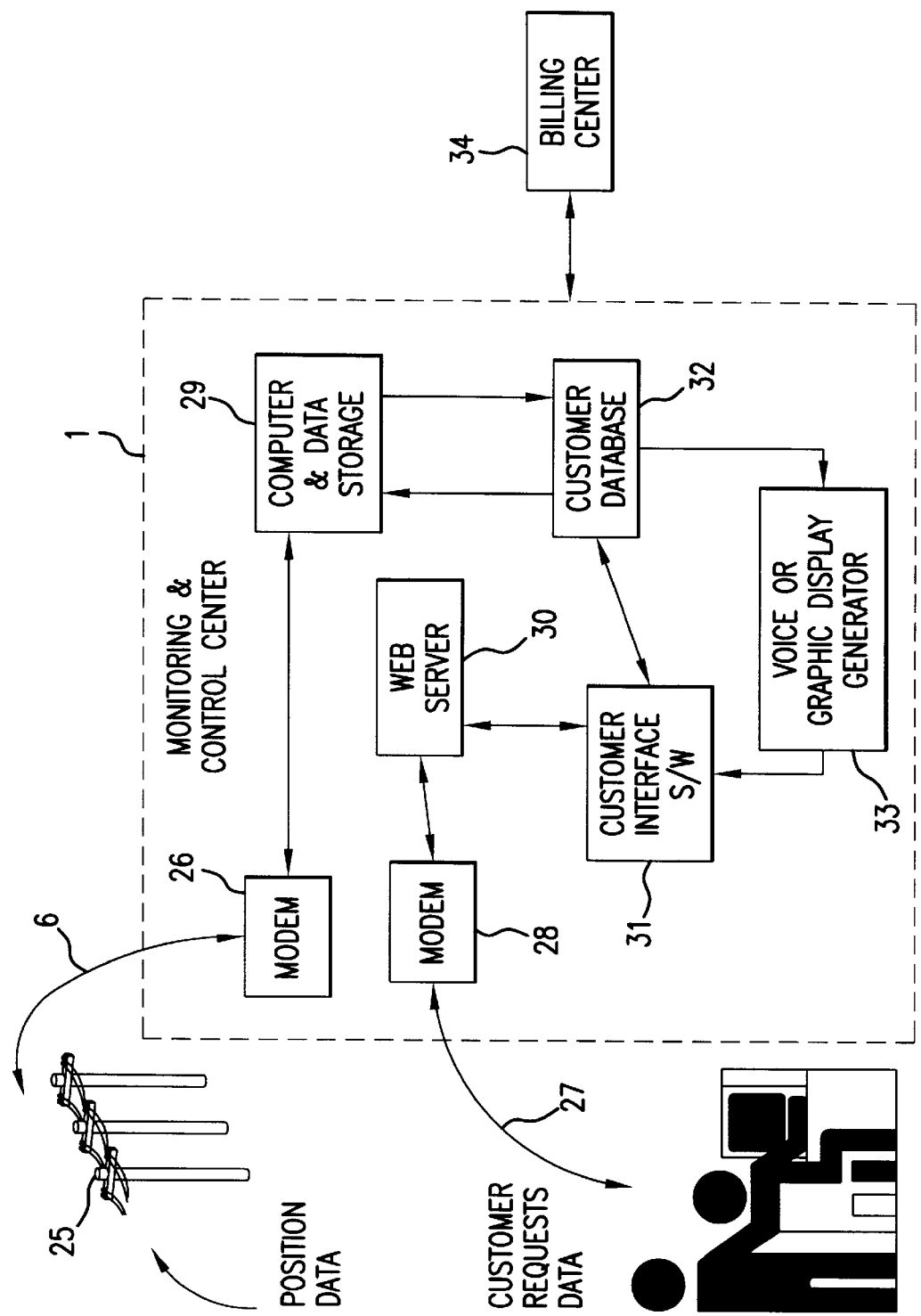
FIG. 4 is a block diagram of a control center for the location, tracking system.

The preferred center of FIG. 4 receives the encrypted position and sensor input data broadcasts of n tags 7 from transmitter/receiver 2 via telephone lines 25, cable 6 and modem 26. The inputs from modem 26 are introduced directly into the computer and its data storage 29.

Customer input data 27, e.g., identification data, are input through the customer digital and/or voice modem 28. The customer input data 27 from digital and/or voice modem 28 is processed through the customer interface 31 and communicated to the customer database 32. Database 32 provides position information to the in-house operator (not shown) via the voice and/or graphics display generator 33 and its speakers and monitor (not shown). The information is reviewed for accuracy, bill payment history, compliance with billing policy, etc., by an operator or by computer 29 means. After review, the customer required information, movement patterns and/or trends or other desired data is forwarded through modem 28 to the customer if bills have been paid in accordance with billing policy. A postally delivered report can also be created through billing center 34.

Sensor(s) 14, if utilized, can be turned on and off, polled or reprogrammed by the microprocessor module 16 through transceiver 10. A suitable sensor 14 can be biological; e.g., pulse and blood 02 concentration; mechanical, e.g., vibration and breakage of a strap binding the tag to an animal or object; electrical, e.g., battery charge conditions, or chemical, e.g., pH ion concentrations of fluids or gases contacting the sensor 14. The sensor 14 can also communicate with the microprocessor, via the transceiver 10 and wireless or other remote communication means. The digital display 13 can be any electrical, mechanical or other form of practical display. Customer requests are shown entering the monitoring and control center 1 of FIG. 4 through a computer (modem) 28. Standard voice recognition and/or queued dial tone input can also be utilized. Data from either of the types of inputs passes through an appropriate customer interface 31 to initiate billing center 34 input for customer payment and policy data input.

The information streams from both of the computer and data storage system 29 and customer interface 31 are utilized by the customer database 32 to generate position information which is put into digital form by the graphical display generator 33 for suitable transmission to the customer by computer modem, facsimile or voice transmission. The control center 1 also provides an output to the billing center for the generation of billing statements.

Figure 5:
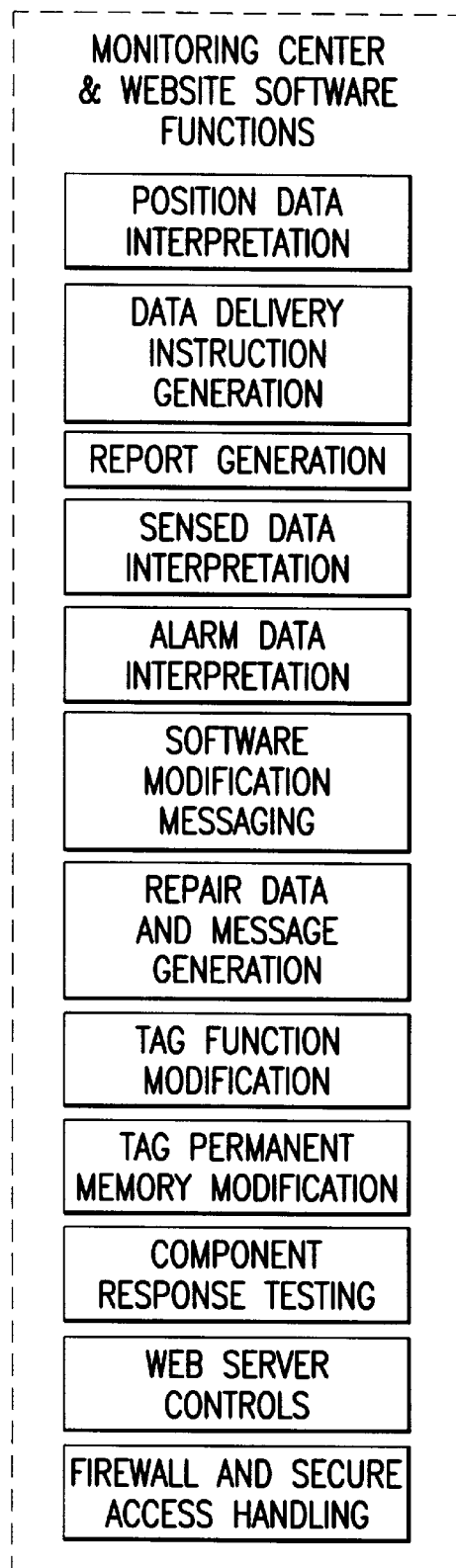
FIG. 5 lists custom software functions associated with the center.

FIG. 5 is a partial list of custom software functions usable by the computer 29 of FIG. 4. The positional data from the tags must be interpreted in terms of the requirements of each client's contract, the periodicity of reporting required, etc. The same is true regarding data received from the sensors and transmitted by the tags within the monitored area and information reporting the remaining battery capacity, the functioning of alarms, system component operations within established operating parameters.

Instructions must be generated and actuated by the center regarding the delivery of the data received to the client(s) and to the operating components of the system requiring input of the sensor 14 based data and system component operating data, alarm data from the various components of the system. Instructions must also be generated for the modification of system component operations and/or software where desired and to introduce into tag permanent memory the location of new repeaters or old repeaters which have been resisted.

What is claimed is:

1. In a system including tags for monitoring at least one of the locating, identifying, counting or controlling animals and/or objects, repeaters and a center for maintaining, controlling and/or locating the animals and objects in time and space for the purpose of determining the locations, numbers rate of movement, if any, and projected movement rate or movement within monitored area, the improvement comprising:

at least one tag comprising a transceiver, a microprocessor and, in permanent microprocessor memory, data representing the positions of the repeaters and center transmitter/receiver in and/or around the monitored area, and custom software having the functions necessary to calculate, from the elapsed time and change of phase between the signals transmitted to each of the at least one tag by the transmitter receiver and/or the repeaters, the position within the system of the at least on tag(s) and to implement the transmission of the calculated position of the at least on tag(s) to the transmitter/receiver and/or to the repeaters.

2. The system of claim 1 further including at least one sensor for transmitting sensed data to the at least one tag and computer functions for causing the at least one tag to receive the sensed data and to transmit the sensed data to the transmitter/receiver and/or repeaters.

3. The system of claim 2 wherein the at least one sensor can sense at least one of biological, chemical, electrical and mechanical phenomena.

4. The system of claim 2 wherein the sensor includes an alarm means.

5. The system of claim 2 wherein the tag includes the sensor.

6. The system of claim 2 wherein the tag is associated with the sensor.

7. The system of claim 2 wherein the at least one of the at least one tag and the at least one sensor includes an alarm means and the functions for sensing predetermined alarm conditions.

8. In the system of claim 1, a center having custom software with the functions of a) interpreting the position signals received from the at least one tag via the transmitter/receiver for a report(s) to at least one client;

b) checking the at least one client's payments for past services for compliance with billing policy and providing delivery instructions for delivery of a report of the location of the at least one tag to an at least one client which is in compliance with center billing payment policy.

9. The custom software of the center of claim 8 further including software means for interpreting sensed data received from the at least one tag.

10. The custom software of the center of claim 8 further including means for interpreting alarm data received from the at least one tag.

11. The custom software of the center of claim 8 further including means for interpreting sensed data and alarm data received from the at least one tag.

12. The custom software of the center of claim 8 further including means for interpreting repair data received from the at least one tag.

13. The custom software of the center of claim 8 further including means for interpreting sensed data, alarm data and repair data received from the at least one tag and means for initiating instructions based on the data received.

14. The custom software of the center of claim 8 further including the function of formulating instructions for modification of the software of the at least one tag to initiate a repair of the at least one tag.

15. The custom software of the center of claim 8 further including the function of formulating instructions for modification of the software of the at least one tag to modify the function(s) of the transmitter/receiver and the at least one repeater.

16. The custom software of the center of claim 8 further including the function of changing the software of the at least one tag to initiate a change of the data in the permanent memory of the at least one tag.

* * * * *